United States Patent [19]

Bandlish

[11] Patent Number: 5,021,132

[45] Date of Patent: Jun. 4, 1991

[54] ELECTROCHEMICAL PROCESS FOR PREPARING 4,4'-DINITROSTILBENE-2,2'-DISULFONIC ACID AND THE SALTS THEREOF

[75] Inventor: Baldev K. Bandlish, Charlotte, N.C.

[73] Assignee: Sandoz Ltd., Basel, Switzerland

[21] Appl. No.: 563,457

[22] Filed: Aug. 7, 1990

[51] Int. Cl.$^5$ .................................................. C25B 3/10
[52] U.S. Cl. .......................................... 204/78; 204/72
[58] Field of Search ...................................... 204/78, 72

[56] References Cited

U.S. PATENT DOCUMENTS

| | | | |
|---|---|---|---|
| 4,382,039 | 5/1983 | Goldschmitt et al. | 562/73 |
| 4,457,813 | 7/1984 | Rogers et al. | 204/78 |
| 4,680,146 | 7/1987 | Skipka et al. | 562/60 |

FOREIGN PATENT DOCUMENTS 1159082 12/1983 Canada.
2136430 3/1983 United Kingdom.

*Primary Examiner*—John F. Niebling
*Assistant Examiner*—Steven P. Marquis
*Attorney, Agent, or Firm*—Gerald D. Sharkin; Richard E. Vila; Diane E. Furman

[57] ABSTRACT

A process is disclosed for electrochemically treating p-nitrotoluene-2-sulfonic acid salts under oxidizing conditions to form 4,4'-dinitrostilbene-2,2'-disulfonic acid or the salts thereof. The process provides satisfactory yields of the stilbene compound while enabling substantial recycling of reaction materials. Substantial benefits are obtained when lithium hydroxide is employed in the reaction medium, including recovery of product of high purity, and improved recovery and recycling of lithium to the process.

24 Claims, No Drawings

ELECTROCHEMICAL PROCESS FOR PREPARING 4,4'-DINITROSTILBENE-2,2'-DISULFONIC ACID AND THE SALTS THEREOF

BACKGROUND OF THE INVENTION

Commercial processes for preparing 4,4'''-dinitrostilbene-2,2'-dilsulfonic acid and the salts thereof generally consist in subjecting p-nitrotoluene-2-sulfonic acid salts to an oxidative condensation reaction in strongly alkaline medium.

Typically in such processes, a chemical oxidizing agent, such as oxygen or oxygen-enriched air (usually with a catalyst), sodium hypochlorite or chlorine, is employed in the presence of alkali or alkaline earth metal hydroxide compounds to result in the coupling of two molecules of p-nitrotoluenesulfonic acid salts to form one molecule of the 4,4'-dinitrostilbene-2,2'-disulfonic acid salt, usually via formation of a stable intermediate compound, 4,4'-dinitro-dibenzyl-2,2'-disulfonic acid salt.

However, conventional oxidizing processes are associated with various operating problems and expenses, e.g., safety hazards involved in the use of oxygen gas or chlorine solutions; or loss of reaction medium in effluent gas at the high oxygen sparging rates which are generally necessary. Additionally, the tendency for oxidative dye by-products to form may necessitate that numerous purification steps be carried out to isolate stilbene compound of sufficient purity for its predominant use as an intermediate in the synthesis of optical brightening agents and dyestuffs.

A particular problem associated with the known chemical oxidation processes concerns treatment and disposal of the large volumes of environmentally deleterious waste which are created, which in general comprise highly alkaline mixtures of hydrocarbon materials, including reaction by-products such as colored dyes and unreacted starting material, as well as metal compounds in high concentration Where chlorine is employed as the oxidizing agent, chlorinated hydrocarbons may also persist as an environmentally objectionable component. Extensive purification of the effluent, including steps of neutralization, removal of organics, and recovery of metal salts, is needed for compliance with environmental standards as well as to recover certain costly starting materials, e.g., compounds of alkali metals such as lithium.

It has therefore been an objective to provide a preparative process which overcomes certain of the limitations associated with the known oxidation processes, especially as these relate to effluent treatment and recovery of starting materials.

SUMMARY OF THE INVENTION

It has now been found possible to achieve attractive yields of 4,4'-dinitrostilbene-2,2'-disulfonic acid and the salts thereof (hereinafter collectively referred to as "stilbene" compound) by a process which in particular permits reductions in effluent and overall improvements in process efficiency.

More particularly, the process of the present invention comprises treating p-nitrotoluene-2-sulfonic acid salts (said acid and salts being referred to collectively as "PNTSA") electrochemically in the anodic compartment of a divided electrolytic cell under conditions which promote oxidative condensation of the PNTSA to form stilbene product.

As a result of subjecting PNTSA to an oxidative condensation reaction according to the process, a stilbene product-containing medium is obtained which is characterized in being reduced in metal concentration, decreased in alkalinity, and reduced in volume. Yield of the stilbene compound and its purity are such that in many cases this product medium may be used directly without further purification to prepare dyes or in a reduction step to form 4,4,'-diaminostilbene-2,2'-disulfonic acid, an important intermediate in the preparation of fluorescent brightening agents and dyestuffs. Alternatively, the stilbene product can be readily isolated from the medium, and advantageously, the resulting product-depleted reaction medium, which may comprise unreacted PNTSA and intermediate compounds, is suitable to be recycled essentially directly to the anodic compartment of the electrolytic cell for reuse in the process. Additionally as a result of the process, a metal ion-enriched aqueous alkaline solution can be recovered from the cathodic compartment of the electrolytic cell, and said solution also provides suitable materials for re-cycle in the process.

Furthermore, the generally reduced temperatures at which the present process in certain of its embodiments may be carried out, assists in preventing formation of oxidative by-products as well as providing a potential energy savings.

Therefore, the process of the invention in its various embodiments provides substantial improvements in an overall process for preparing stilbene compound and with particular regard to effluent treatment and recovery and recycling of starting materials.

Other aspects, objects and advantages of the present invention will become apparent herein.

DESCRIPTION OF THE INVENTION

The process of the present invention is carried out by electrochemically treating an aqueous alkaline reaction medium comprising PNTSA in an electrolytic cell for a time and under conditions sufficient to result in oxidative condensation of the PNTSA to form a coupled intermediate compound, namely, 4,4'-dinitrodibenzyl-2,2'-disulfonic acid salt (said acid and salts being referred to hereinafter as "dibenzyl" compound), which in turn is further oxidized to the stilbene product.

According to the process of the invention, the aqueous alkaline reaction medium comprising PNTSA is charged to the anodic compartment of a divided electrolytic cell, and an aqueous alkaline solution is also provided in the cathodic compartment, as well as in any reference compartment.

The anode of the divided electrolytic cell may be made from any conventional suitable material such as platinum or iridium, either of which may be coated over an inert support such as niobium or titanium, and is preferably nickel, particularly porous expanded nickel such as comprises a Retec ® electrode (Eltech Research Corp.) The cathode may be formed of conventional materials preferably having good alkali corrosion resistance, e.g., lead or stainless steel. In part because of corrosion, graphite, for example, is less preferred and typically is unsuitable as a cathode under the process conditions of the invention.

The anodic and cathodic compartments are separated by a semipermeable barrier selected to permeate alkali or alkaline earth metal ions but not the organic compounds of the invention. The barrier may comprise a ceramic porous diaphragm, ion exchange membrane (e.g., a Nafion membrane) or other type of membrane Suitable electrolytic cells which can be employed with a semipermeable barrier as divided cells are an H-type cell, which is usually employed in small-scale operations, and a plate and frame cell.

The cell may be sealed or unsealed, since neither the presence nor absence of atmospheric oxygen is critical to the invention.

The aqueous alkaline solutions employed in the process of the invention are prepared by combining water with a source of alkali metal or alkaline earth metal ions and a source of hydroxyl ($OH^-$) ions. A single source may of course provide both types of ions.

Alkali or alkaline earth metal ions generally useful in the process comprise those which can form salts which are at least minimally water-soluble with PNTSA, the dibenzyl intermediate compound, and the stilbene compound, e.g., ions of sodium, potassium and lithium, of which lithium is most preferred. Mixtures of such ions, e,g., sodium and potassium, and lithium and sodium, have been found particularly useful as is hereinbelow more fully described. However, the tendency of certain of the alkaline earth metal ions, e.q., calcium or magnesium, to deteriorate membranes, renders them less suitable in processes employing a membrane as the semipermeable barrier.

The various alkali or alkaline earth metal ions are preferably supplied from various compounds such as hydroxides, oxides, amides, alcoholates and sulfides.

Most preferably among the foregoing compounds an oxide and/or hydroxide is used since these compounds release hydroxyl groups in water as well as the desired metal ions, and therefore the addition of another compound releasing a hydroxyl group may be omitted. However, if the selected alkali or alkaline earth metal compound does not release hydroxyl ions (e.g., chlorides, bromides, acetates, halides, etc.), then a source of hydroxyl ion will need to be supplied, for example, by adding the hydroxide compounds of the same or other alkali or alkaline earth metal ions, or quaternary ammonium hydroxides.

The particular metal ion or mixtures of ions employed will depend to an extent on the conditions of the reaction, including the solubility of the resulting PNTSA and reaction product salts in the aqueous alkaline reaction medium of the invention, the reaction temperature, and the like. In general, the total concentration of metal ions suitably provided to the reaction medium is about 1 to 30 wt.% based on the total reaction medium.

The reaction medium is formed by combining PNTSA with the above-described aqueous alkaline solution in an amount of about 3 to 35 wt.% PNTSA (based on the weight of the acid form) based on the total reaction medium The amount of PNTSA provided to the reaction medium will depend to an extent on its solubility, i.e. greater concentrations of the lithium salt than the sodium salt may generally be employed to enhance solubility, for example.

The reaction medium may additionally comprise various well-known additives which do not adversely affect the process, e.g., surfactants.

The concentration of hydroxyl ions, $OH^-$, provided to the reaction medium should be about 0.05 to about 1 moles per 100 grams of reaction medium, and preferably from about 0.2 to about 0.4 moles per 100 grams of reaction medium.

It is preferable but not essential to use the same source of $OH^-$ ions in preparing the reaction medium and the cathodic solution However, the $OH^-$ concentration in each of these solutions may differ.

It will be recognized that as PNTSA and the dibenzyl intermediate are oxidized at the anode, the hydroxyl or other basic ions in the reaction medium may also be consumed by oxidation to form various oxidized species. Therefore make-up quantities of base may be added as needed to the reaction medium to maintain a desired basicity during the course of the reaction. Also, since commercially obtained PNTSA may comprise a sulfuric acid component, the amount of base initially provided to the reaction medium should be adjusted accordingly to compensate therefor if necessary.

To carry out the oxidation process of the invention, a potential is supplied to the electrodes, and a direct electric current is passed to the cell. A current density of about 1 to about 30 amperes per square decimeter (ASD), preferably about 5 to about 15 ASD, is maintained.

Current is applied for a time sufficient to result in oxidative condensation of PNTSA to form the intermediate dibenzyl compound and for at least a portion of the dibenzyl intermediate to be oxidized to form the stilbene product.

An evident advantage of the electrochemical process of the invention is that simply increasing the surface area of the electrodes will result in increased current being passed and reduced reaction time. A further advantage is that in general the oxidative condensation reaction may be terminated simply by removing the current; and provided that suitable steps are then taken (e.g., neutralization with acid) to prevent undesired reactions from occurring after current is removed, it is possible thereafter to resume the oxidative condensation reaction by restoring basicity to the reaction medium and reapplying the current.

In the process of the invention, an aqueous alkaline solution is initially charged to each of the anodic and cathodic compartments, a potential is then applied and direct current is passed, followed by addition of PNTSA to the solution in the anodic compartment. To help avoid formation of oxidative dye by-products which can occur if portions of the PNTSA are not well distributed near the electrode, it is important that the reaction medium be in an agitated state on a continuous or at least semi-continuous basis, for example by use of mechanical means such as a stirrer and preferably in addition, by bubbling through a gas such as air or nitrogen.

Particularly when a reaction medium comprising, for example, sodium hydroxide, is employed in which the PNTSA (as well as the reaction products) is minimally soluble, it is desirable that the PNTSA be delivered gradually at a regulated rate to the medium to maintain good flow characteristics of the resulting slurry.

As a result of application of current under the conditions of the invention, PNTSA is stripped of an electron and by various postulated mechanisms proceeds to formation of a coupled oxidation intermediate product, i.e. the dibenzyl compound, which itself is thereafter oxidized to form the stilbene compound. Concurrently, and continuing even after complete oxidation of PNTSA to dibenzyl and stilbene compound has occurred if current continues to be supplied to the reaction medium, various other species in the reaction medium are oxidized, including OH⁻ or other basic ions, as previously described. Advantageously the gradual removal of free basic ions from the reaction medium in this manner can result, in certain embodiments, in a reduction in pH of the medium from greater than pH 14 at the start of reaction to a value of about pH 1 or below. As a result, substantial reductions can conveniently be made in the amount of added salts and/or acids which typically are employed to isolate stilbene product from reaction media in which it is formed. Additionally, depletion in the concentration of basic ions in the reaction medium during the process of the invention is accompanied by a net migration of positively charged alkali or alkaline earth metal ions, generally complexed with water, from the anodic compartment through the membrane or other semipermeable barrier of the divided cell to the aqueous alkaline solution in the cathodic compartment, where the said metal ions are reduced and then react with water to form metal hydroxides.

Therefore when carried out for a suitable duration, the process of the invention can in general result in formation in the anodic compartment of a product-containing medium which is characterized in being reduced in metal content and decreased in alkalinity, as well as reduced in volume due to water loss to the cathodic compartment. Conversely, there will also be generated separately, in the cathodic compartment, an alkaline solution which is metal-ion enriched and often increased in volume.

Assuming current is continuously supplied and the reactants are present in excess, the reaction will proceed until the reaction medium becomes acidic, i.e. has a pH below about 7, which occurs either by loss of OH⁻ ions from the solution as a result of application of current and/or by actual addition of strong acid to the solution. In order to precipitate the resulting stilbene product from the medium, the pH should be brought to about 1 and preferably below 1. This is accomplished either by continuing to pass current to the reaction medium and/or by adding strong acid such as concentrated hydrochloric or sulfuric acid. Salts may be also be added to the reaction medium for precipitation of the stilbene product.

Formation of stilbene product in the substantial absence of side-products is made evident by the reaction medium remaining substantially light colored whether in the form of a slurry or solution. Advantageously in the various embodiments of the present invention, the resulting product-containing medium is not deeply colored by oxidative dye by-products, indicating that a relatively uncontaminated product has been formed. In many cases, the medium may be used directly without further purification to prepare useful compounds from the stilbene product by conventional methods.

Advantageously, however, if the stilbene product is isolated from the reaction medium (e.g., by salting out and/or acidification of the reaction medium, if necessary, and filtration), the resulting filtrate, which may comprise unreacted PNTSA and/or dibenzyl compound, can be recycled to a PNTSA electrochemical process according to the invention.

Prior to recycling the filtrate to the anodic compartment, a desired level of alkalinity can be restored thereto by adding an appropriate amount of alkaline solution from the cathodic compartment or from any other source.

A significant advantage of the overall process of the invention therefore is that it may be carried out efficiently on a continuous or semi-continuous basis with little or substantially no loss of the advantages realized in the process as initially conducted, and furthermore, with substantial benefits gained by recycling of materials.

For example, in one embodiment the spent reaction medium recovered in the anodic compartment of the electrolytic cell, comprising a mixture of organic materials and metal ions, may be recycled without loss of material for use in an electrochemical oxidation step according to the process of the invention to prepare additional stilbene compound; and the metal-ion enriched increased alkaline solution recovered in the cathodic compartment of the electrolytic cell may also be employed subsequently as a source of reaction materials.

In another embodiment, PNTSA-containing reaction medium is introduced into the anodic compartment of a first electrochemical cell wherein the cathodic compartment contains an aqueous alkaline solution; the reaction medium is electrochemically treated under the general conditions of the invention to an extent sufficient to result in a desired conversion of PNTSA to the stilbene product; the resulting medium is withdrawn from the first cell, and passed to the anodic compartment of a second electrochemical cell (and optionally thereafter to a third and successive cells), wherein the medium is further oxidized as appropriate to achieve additional conversion. The resulting stilbenecontaining medium can then be withdrawn from the anodic compartment and subjected if necessary to conventional work-up procedures to recover a solid product, and the productdepleted reaction medium (after optionally combining with solution recovered from the cathodic compartment) may be recycled back to an electrochemical cell of the process. Advantageously in the above-described continuous process, electrode surface area may be increased without the practical difficulties encountered using a single cell, and residence time of the reaction medium in the anodic compartment can also be effectively increased.

According to a specific embodiment of the invention, a slurry comprising the PNTSA in aqueous sodium hydroxide is subjected to direct current in the anodic compartment of an electrolytic cell initially at a temperature of about 30°–45° C. An aqueous sodium hydroxide solution is provided in the cathodic compartment. It is generally necessary when employing sodium hydroxide in significant concentration, in order to improve solubility of the dibenzyl intermediate compound in the reaction slurry, to maintain somewhat elevated reaction temperatures, e.g., about 50°–65° C., and also to add a source of certain additional ions, particularly potassium or lithium, in an amount effective to provide enhanced solubility and/or reactivity of the dibenzyl compound. Water of dilution may also be added to the slurry to enhance solubility if indicated. As the reaction proceeds, dibenzyl compound is further oxidized to the stilbene product and free OH⁻ ions in the reaction medium are removed by oxidation, causing sodium and the added potassium ions to co-permeate the membrane and pass into the cathodic solution. After removal of current, the product-containing medium is optionally further acidified to a pH of about 1 or less by addition of a strong acid, such as hydrochloric acid, in order to facilitate recovery of the resulting yellow crystalline stilbene salts. The solids are recovered by filtration, and the resulting filtrate is an acidic liquid comprising both sodium and potassium salts as well as any unreacted PNTSA or dibenzyl compound. The cathodic solution comprises an aqueous sodium and potassium hydroxide solution.

It is an aspect of this invention that a PNTSA reaction medium which initially comprises a mixture of metal ions such as sodium and, e.g., potassium, may also be satisfactorily used in the process to form stilbene compound. Therefore the above-recovered filtrate, having been adjusted for $OH^-$ concentration by addition of make-up base, may optionally be recycled to an electrochemical step according to the present process. Furthermore, at least a portion of the cathodic solution from the reaction may then be employed in various uses, including as a source of the make-up base.

In a preferred embodiment of the invention, the reaction medium comprises an aqueous lithium hydroxide solution of PNTSA. Lithium is known to form very soluble salts with PNTSA and its reaction products and therefore the amount of PNTSA charged per unit volume of the reaction medium can be increased substantially. However, a recognized limitation heretofore associated in practice with a lithium hydroxide PNTSA oxidation process concerns the expense of effecting lithium recovery and re-cycling to the reaction. Typically this is carried out by adding to the product-containing reaction medium prior to recovering the stilbene compound, an agent (e.g., carbon dioxide, and alkali carbonates and bicarbonates) to precipitate lithium in the form of lithium carbonate, then isolating the resulting lithium carbonate, and finally converting the carbonate back to lithium hydroxide.

It has now been found possible according to the process of the invention to employ lithium hydroxide in an electrochemical oxidation process to form stilbene compound, and also to recover from the cathodic compartment lithium hydroxide solution suitable for direct recycling to the process, without performing costly isolation procedures.

Furthermore, it has also been found that in certain preferred embodiments of the present invention, particularly employing lithium hydroxide in the reaction medium, formation of the stilbene product can be achieved when the process is conducted in its entirety at relatively low temperature, e.g., in the range of about 30° to 60 °C., and preferably about 35°-45° C.

Additionally, the process employing lithium hydroxide provides attractive yields of stilbene product of very high purity.

In an example of the practice of the invention employing a lithium hydroxide reaction medium, the clear solution of PNTSA is subjected to current in the anodic compartment of an electrolytic cell, under conditions as previously recited, at a temperature preferably in the range of about 35-45° C. The cathodic compartment preferably also contains a lithium hydroxide solution. After current is removed, the product-containing reaction medium comprises an acidic solution of the lithium salt of stilbene compound, as well as any unreacted PNTSA and/or dibenzyl compound. The resulting solution in the cathodic compartment comprises aqueous lithium hydroxide solution.

The pH of the medium will preferably have been reduced to about 1 or below during the process, in which case a very pure lithium salt of the stilbene compound may be recovered by simple filtration without the necessity to add acid or salts to the reaction medium. The filtrate, which comprises an acidic lithium solution, can be recycled back to the process. Preferably, where stilbene has been obtained in high yield and the purity is also high, the resulting reaction medium may in certain cases be directly used o prepare other compounds from the stilbene by conventional methods, without prior isolation of the stilbene compound.

A primary advantage is that the cathodic lithium hydroxide solution is of course suitable as a source of lithium hydroxide ions in the process, without having to proceed through formation of lithium carbonate.

In the event the pH of the reaction medium cannot be brought lower than about 1 without excessive currents being passed, it is possible to effect isolation of the stilbene salt by conventional means, i.e. by salting out and/or acidification (e.q., with sodium salt and strong acid). Where a sodium salt is employed to precipitate the product, the filtrate in this case must therefore comprise not only lithium but also sodium salts.

Advantageously, it is an aspect of this invention that a reaction medium comprising both lithium and sodium salts can satisfactorily be subjected to the process of the invention under the general conditions herein recited.

In particular, it has been found that very effective isolation of lithium salts is provided in a process wherein both sodium and lithium ions are present in the reaction medium at least when the stilbene product is isolated. Advantageously, with only sparing addition of acid, the predominantly sodium salts of the stilbene compound are precipitated while most of the lithium ions remain in solution, to be conveniently re-cycled to subsequent oxidative condensation reactions according to the invention.

The stilbene compound can be further reduced to form 4,4'-diaminostilbene-2,2'-disulfonic acid, an important intermediate in the preparation of dyes and fluorescent brightening agents, or be further reacted to prepare dyes.

The following examples are intended to be illustrative only, and not limitative of the invention.

EXAMPLE 1

An H-type two compartment glass cell equipped with a mechanical stirrer in the anodic compartment, a potentiostatic controller, DC power supply, coulometer, 100A shunt, and a Haake circulator is employed for electrolysis.

An R-1010 ion exchange membrane (Electrosynthesis Co.) separates the anodic and cathodic compartments. The cathode is a copper coil 25 sq. cm. in surface area, and the anode is a platinum mesh cylinder having an apparent surface area of 25 sq. cm. A side tube connected to the anodic compartment serves as a reference compartment, which contains a saturated calomel electrode (SCE). The anolyte is stirred with a mechanical stirrer. Nitrogen is continuously bubbled through the solution in the anodic compartment.

(a) A solution comprising 25 g. of NaOH and 1 g. of the surfactant Surfynal ® in 100 ml. of water is charged to the anodic compartment.

A solution comprising 5 g. of NaOH in 50 ml. of water is added to the cathodic compartment. The reference compartment contains 1 g. of NaOH in 5 ml. of water.

The solutions are heated to a temperature of about 38-39° C.

A direct current of about 2.32 to 6.76 ASD is passed at a potential of about 0.7 to 1.64 volts with respect to SCE.

(b) 25 g. of commercially prepared PNTSA (which is inclusive of 5.0 g. of water, and 1.9 g. of sulfuric acid, resulting in a net weight of 18.1 g. of PNTSA) in 80 ml. of water is delivered gradually to the solution in the anodic compartment over a period of about 23 minutes. To the resulting slurry is added approximately 5 g. of NaOH in 100 ml. of water. As dibenzyl compound is formed in increasing amounts as detected by thin layer chromatography, a solution comprising 58 g. of KOH in 50 ml. of water is provided in installments by burette to the reaction medium, and the temperature of the reaction medium is gradually increased to about 60° C.

Current is applied for an initial period of about 13 hours, after which current is stopped and 55 ml. of concentrated hydrochloric acid is added to the reaction medium, which is then stored for about 8 hours. 12 g. of KOH in 20 ml. of water are then added to the reaction medium, and current is resumed for an additional 13.6 hours during which 100 ml. of water are added to the medium.

(c) The current is removed, 37 ml. of HCl are added to the reaction medium, and the precipitated solids are filtered. A clear yellow crystalline product is collected having a wet weight of 19.2 g. and a dry weight of 14.5 g.

HPLC analysis shows that the product comprises sodium and potassium salts of 4,4'-dinitrostilbene-2,2'-disulfonic acid (77.76 wt.%), 4,4'-dinitrobenzyl-2,2'disulfonic acid (8.3 wt.%), and p-nitrotoluene-2-sulfonic acid (1.16 wt.%). HPLC analysis reveals 0.08 g. of PNTSA in the mother liquor.

The stilbene product can be further purified by conventional means.

EXAMPLE 2

A multipurpose plate and frame cell (Electro MP-cell from Electrocell EBB) equipped with a DC power supply, coulometer, 100 A shunt, glass reservoir equipped with a mechanical stirrer, pumps, and a Haake circulator, is employed for electrolysis.

A Nafion 324 ion exchange membrane separates the anodic and cathodic compartments. The cathode comprises a sheet of copper, 100 sq. cm., and the anode comprises a sheet of platinum and iridium oxide coated over titanium, 100 sq. cm. The electrodes are separated by 1.5 cm. Nitrogen is continuously bubbled through the solution in the anodic compartment.

(a) A solution comprising 30 g. of lithium hydroxide monohydrate in 300 ml. of water is charged to the anodic compartment, and a solution comprising 57.2 g. of lithium hydroxide monohydrate in 500 ml. of water is charged to the cathodic compartment. The temperature of the solutions is raised to about 30–32° C.

A direct current of about 4 to 6 ASD is passed at a potential of about 3.2 to 4.2 volts.

(b) 40 g. of commercially prepared PNTSA (which is inclusive of 6.6 g. of water and 1 g. of sulfuric acid, resulting in a net weight of 32.4 g. of PNTSA) in 50 ml. of water is delivered gradually to the solution in the anodic compartment over a period of about 3 hours. To the resulting solution is added an additional 55 g. of lithium hydroxide monohydrate in 300 ml. of water.

The temperature of the reaction medium is gradually increased to about 55 ° C.

Current is applied for an initial period of about 12.2 hours, after which current is stopped and 23 ml. of concentrated sulfuric acid is added to the reaction medium, which is then stored for about 8 hours.

40 g. of commercial PNTSA and 90 g. of lithium hydroxide monohydrate in 450 ml. of water are then added to the medium over 5.5 hours, and current is resumed for an additional 8.4 hours.

(c) After the current is removed, 28 ml. of sulfuric acid and 71 g. of sodium chloride are added to the reaction medium, and the precipitated solids are filtered. A clear yellow crystalline product is collected having a dry weight of 33.1 g.

HPLC analysis shows that the product comprises sodium and lithium salts of 4,4'-dinitrostilbene-2,2'disulfonic acid (95 wt.%), 4,4'-dinitrobenzyl-2,2'- disulfonic acid (4.0 wt.%), and p-nitrotoluene-2-sulfonic acid (0.7 wt.%). By titration, the solution in the cathodic compartment is determined to contain 123.6 g. lithium hydroxide monohydrate, i.e. an additional 52.8 g. over the initial amount.

The filtrate can be recycled to the anodic compartment, and the cathodic solution provides a source of lithium hydroxide monohydrate in subsequent rections.

EXAMPLE 3

The apparatus of Example 1 is employed.

(a) A 75 ml. portion of a solution comprising 12 g. of lithium hydroxide monohydrate in 80 ml. of water is charged to the anodic compartment. The remaining 5 ml. of this of solution is used as the reference solution.

7.18 g. of lithium hydroxide monohydrate in 70 ml. of water is charged to the cathodic compartment. The temperature of the solutions is maintained at about 40° C.

A direct current of about 4.76 to 6.60 ASD is passed at a potential of about 0.78 to 1.6 volts with respect to SCE.

(b) 10 g. of commercially prepared PNTSA (which is inclusive of 1.7 g. of water, and 0.3 g. of sulfuric acid, resulting in a net weight of 8 g. of PNTSA) in 30 ml. of water is delivered to the solution in the anodic compartment. To the resulting solution is added an additional 10 g. of lithium hydroxide monohydrate in 40 ml. of water.

The temperature of the reaction medium is gradually increased to about 60 ° C.

Current is applied for about 6.5 hours.

(c) After the current is removed, 81 ml. of concentrated hydrochloric acid are added to the reaction medium, and a yellow precipitate appears The reaction medium is heated to about 65° C. until the precipitate dissolves and is then cooled. A clear yellow crystalline product is collected by filtration having a dry weight of 5.8 g. The yield is determined to be 72.5%.

HPLC analysis of the product indicates that substantially pure 4,4'-dinitrostilbene-2,2'-disulfonic acid is obtained. No dibenzyl derivative and only a trace amount (c.a. 0.1%) of p-nitrotoluene-2-sulfonic acid are detectible by HPLC.

EXAMPLE 4

The apparatus of Example 1 is employed.

(a) 19 g. of lithium hydroxide monohydrate and 6 g. of sodium hydroxide in 200 ml. of water are charged to the anodic compartment. 5 ml. of the above solution is used as the reference solution.

4.6 g. of lithium hydroxide monohydrate and 1.5 g. of sodium hydroxide in 60 ml. of water are added to the cathodic compartment. The temperature of the solutions is maintained at about 45 °C.

A direct current of about 4 to 3.1 ASD is passed at a potential of about 0.63 to 1 volts with respect to SCE.

(b) 25 g. of commercially prepared PNTSA (which is inclusive of 4.15 g. of water, and 0.625 g. of sulfuric acid, resulting in a net weight of 20.2 g. of PNTSA) in 30 ml. of water is delivered to the solution in the anodic compartment.

Current is applied for about 12 hours.

(c) After the current is removed, 4 ml. of concentrated sulfuric acid are added to the reaction medium, which is then cooled. A clear yellow crystalline product is collected by filtration having a dry weight of 7.5 g.

The product by HPLC analysis is predominantly 4,4'-dinitrostilbene-2,2'-disulfonic acid salt (of which 70.3 wt.% is the sodium salt and 28.2 wt.% is the lithium salt), and a trace amount of PNTSA. The filtrate comprises 1.22 g. of lithium ions, 0.575 g. of sodium ions, 5.0 g. of stilbene compound, 0.44 g. of dibenzyl compound, and 3.41 g. of PNTSA. The lithium hydroxide monohydrate generated in the catholyte is 7.9 g. The sodium hydroxide generated in the catholyte is 3.25 g.

The filtrate is recycled after adding thereto additional PNTSA and lithium solution recovered from the cathodic compartment, to make additional stilbene product.

What is claimed is:

1. An electrochemical process for preparing 4,4'-dinitrostilbene-2,2'-disulfonic acid or the salts thereof which comprises the steps of:
   a. providing an aqueous alkaline reaction medium comprising p-nitrotoluene-2-sulfonic acid salts (PNTSA) in the anodic compartment of an electrolytic cell, and providing an aqueous alkaline solution in the cathodic compartment;
   b. passing current to the cell at a current density of about 1 to 30 A/dm$^2$ for a time and under conditions sufficient to result in oxidative condensation of PNTSA to form 4,4'-dinitrostilbene-2,2'-disulfonic acid or the salts thereof.

2. A process according to claim 1 wherein the aqueous alkaline reaction medium comprises ions of at least one alkali metal and hydroxyl (OH$^-$) ions.

3. A process according to claim 2 wherein said alkali or alkaline earth metal ions are selected from sodium, potassium, lithium, and mixtures thereof, and said ions are introduced to the reaction medium in the form of a compound selected from hydroxides, oxides, amides, alcoholates, and sulfides and mixtures thereof.

4. A process according to claim 3 wherein said ions are selected from lithium and sodium and mixtures thereof.

5. A process according to claim 3 wherein said compound is selected from sodium hydroxide, potassium hydroxide, lithium hydroxide, and mixtures thereof.

6. A process according to claim 5 wherein the compound is lithium hydroxide.

7. A process according to claim 2 wherein the concentration of said alkali or alkaline earth metal ions is about 1 to 30 wt.% based on the total reaction medium.

8. A process according to claim 1 wherein PNTSA is present in the aqueous alkaline reaction medium in an amount of about 3 to 35 wt.% (based on the weight of the acid form) based on the reaction medium.

9. A process according to claim 8 wherein the OH$^-$ concentration in the reaction medium is about 0.05 to about 1 Mole percent, and preferably from about 0.2 to about 0.4 Mole percent.

10. A process according to claim 3 wherein the cathodic solution comprises a solution of sodium hydroxide, lithium hydroxide, potassium hydroxide or their mixtures.

11. A process according to claim 1 wherein the anode comprises porous expanded nickel, and the cathode comprises stainless steel.

12. A process according to claim 1 wherein the 4,4'-dinitrostilbene 2,2'-disulfonic acid or a salt thereof is recovered as a solid from the reaction medium, and the resulting liquid after adjusting pH is optionally recycled to step (a) of the process.

13. A process according to claim 12 wherein the recovered 4,4'-dinitrostilbene- 2,2'-disulfonic acid or a salt thereof is then subjected to chemical reducing conditions to form 4,4'-diaminostilbene- 2,2'-disulfonic acid or the salts thereof.

14. A process according to claim 1 wherein the reaction medium formed n step (b) is then subjected to reducing conditions to form 4,4'-diaminostilbene- 2,2'-disulfonic acid or the salts thereof.

15. A process according to claim 1 wherein the cathodic solution from step (b) is recycled to step (a) of the process.

16. A process according to claim 1 which is carried out as a continuous process.

17. An electrochemical process for preparing 4,4'-dinitrostilbene-2,2'-disulfonic acid or the salts thereof which comprises the steps of:
   a. providing an aqueous lithium hydroxide reaction medium comprising p-nitrotoluene-2-sulfonic acid salts (PNTSA) in the anodic compartment of an electrolytic cell, and providing an aqueous lithium hydroxide solution in the cathodic compartment;
   b. passing current to the cell at a current density of about 1 to 30 A/dm$^2$ for a time and under conditions sufficient to result in oxidative condensation of PNTSA to form 4,4'-dinitrostilbene-2,2'- disulfonic acid or the salts thereof.

18. The process of claim 17 wherein the 4,4'-dinitrostilbene-2,2'-disulfonic acid or a salt thereof is recovered as a solid product from the reaction medium, the resulting liquid being optionally recycled to step(a) of the process.

19. A process according to claim 18 wherein 4,4'-dinitrostilbene-2,2'-disulfonic acid is recovered by adding a strong acid to the resulting reaction medium in an amount effective to precipitate the solids from the reaction medium.

20. A process according to claim 18 wherein 4,4'-dinitrostilbene-2,2'-disulfonic acid salts are recovered by adding an amount of sodium salts sufficient to precipitate from solution a mixture comprising lithium and sodium salts of the stilbene compound.

21. A process according to claim 17 wherein the reaction medium resulting from step (b) comprising 4,4'-dinitrostilbene-2,2'-sulfonic acid or the salts thereof is then subjected to reducing conditions to form 4,4'-diaminostilbene-2,2'-disulfonic acid or the salts thereof.

22. A process according to claim 17 wherein the cathodic solution from step (b) is recycled to step (a) of the process.

23. A process according to claim 17 wherein the reaction temperature is in the range of about 35 to 45 °C.

24. A process according to claim 17 wherein the reaction medium additionally comprises sodium ions.

* * * * *